US008955651B2

(12) United States Patent
Karl et al.

(10) Patent No.: US 8,955,651 B2
(45) Date of Patent: Feb. 17, 2015

(54) BRAKE DISC

(75) Inventors: Stefan Karl, Munich (DE); Kordian Kokott, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 201 days.

(21) Appl. No.: 13/617,659

(22) Filed: Sep. 14, 2012

(65) Prior Publication Data
US 2013/0032440 A1 Feb. 7, 2013

Related U.S. Application Data

(63) Continuation of application No. PCT/EP2011/052757, filed on Feb. 24, 2011.

(30) Foreign Application Priority Data

Mar. 27, 2010 (DE) .......................... 10 2010 013 160

(51) Int. Cl.
F16D 65/12 (2006.01)
F16D 65/02 (2006.01)

(52) U.S. Cl.
CPC ........ *F16D 65/12* (2013.01); *F16D 2065/1316* (2013.01); *F16D 2065/1348* (2013.01); *F16D 2065/1392* (2013.01); *F16D 2200/0013* (2013.01); *F16D 2200/0021* (2013.01); *F16D 2200/003* (2013.01); *F16D 2200/0039* (2013.01)
USPC .................... 188/218 XL; 188/18 A; 301/6.8

(58) Field of Classification Search
USPC ............. 188/218 XL, 17, 18 A, 18 R, 218 R, 188/264 A; 301/6.8
See application file for complete search history.

(56) References Cited

U.S. PATENT DOCUMENTS

| 4,645,041 | A | 2/1987 | Bass |
| 5,810,123 | A | 9/1998 | Giorgetti et al. |
| 7,934,777 | B1 * | 5/2011 | Yuhas ............................. 301/6.8 |
| 8,720,654 | B2 * | 5/2014 | Kokott et al. ........... 188/218 XL |
| 2002/0139622 | A1 * | 10/2002 | Chen ....................... 188/218 XL |

(Continued)

FOREIGN PATENT DOCUMENTS

| DE | 195 33 571 A1 | 4/1996 |
| DE | 101 61 719 A1 | 6/2003 |

(Continued)

OTHER PUBLICATIONS

German Search Report dated Sep. 2, 2011 with partial English translation (ten (10) pages).

*Primary Examiner* — Pamela Rodriguez
(74) *Attorney, Agent, or Firm* — Crowell & Moring LLP

(57) ABSTRACT

A brake disc for a vehicle disc brake has a friction ring supported by a brake disc chamber made of a specifically light material and having a central flat hub section perpendicular to the axis of rotation of the brake disc and a support wall section connected thereto. The support wall section extends radially outward and in some regions has a truncated circular cone shape, with whose free edge region the friction ring is connected via connection elements. The ratio of the height of the friction ring to the diameter of the brake disc is less than 0.12, and the connection between the brake disc chamber and the friction ring is provided with a prestressed support wall section such that the edge region of the brake disc chamber acts in an outwardly pressing manner upon the unheated friction ring directly or indirectly by way of the connection elements.

12 Claims, 2 Drawing Sheets

(56) References Cited

U.S. PATENT DOCUMENTS

| | | |
|---|---|---|
| 2003/0121733 A1 | 7/2003 | Niebling et al. |
| 2004/0134720 A1* | 7/2004 | Niebling et al. ............ 188/18 A |
| 2004/0182660 A1* | 9/2004 | Cavagna et al. ........ 188/218 XL |
| 2005/0126870 A1* | 6/2005 | Doppling et al. ....... 188/218 XL |
| 2005/0145452 A1 | 7/2005 | Yamamoto |
| 2007/0193837 A1* | 8/2007 | Lamb ..................... 188/218 XL |
| 2009/0020379 A1* | 1/2009 | Hanna et al. ............ 188/218 XL |
| 2010/0101902 A1* | 4/2010 | Kano et al. .............. 188/218 XL |

FOREIGN PATENT DOCUMENTS

| | | |
|---|---|---|
| DE | 10 2005 060 440 A1 | 4/2007 |
| DE | 10 2006 043 945 A1 | 3/2008 |

* cited by examiner

BRAKE DISC

CROSS REFERENCE TO RELATED APPLICATIONS

This application is a continuation of PCT International Application No. PCT/EP2011/052757, filed Feb. 24, 2011, which claims priority under 35 U.S.C. §119 from German Patent Application No. 10 2010 013 160.1, filed Mar. 27, 2010, the entire disclosures of which are herein expressly incorporated by reference.

BACKGROUND AND SUMMARY OF THE INVENTION

The invention relates to a brake disc for a vehicle disc brake, particularly for passenger cars, and especially to a ventilated brake disc having a friction ring. In the case of a ventilated brake disc having a double-walled friction ring, the friction ring is supported by a brake disc chamber made of a specifically light material, which has a central flat hub section perpendicular to the axis of rotation of the brake disc, as well as a so-called support wall section which is connected thereto, extends radially outward and in some regions has a truncated circular cone shape, with whose free edge region the possibly internally ventilated friction ring, which consists of a different material, is connected by way of connection elements. Concerning the state of the art, reference is made, for example, to German Patent document DE 10 2006 043 945 A1.

So-called built-up motor vehicle brake discs having a friction ring made of a first material, such as gray cast iron or a special steel, which interacts with brake pad friction linings during operation, and having a so-called brake disc chamber made of a different material, such as a light metal alloy, which supports this friction ring, are known in many different developments. On motor vehicles, particularly passenger cars, it is endeavored to design all components, and particularly the unsprung masses, which include the brake discs normally arranged directly on or within the wheel(s), to be as light as possible. The brake disc chamber is therefore manufactured of a material of low specific weight, thus, particularly of an aluminum alloy. Accordingly, the friction ring can also consist of a specifically extremely light material. However, because of the interaction with the friction lining, no conventional aluminum alloy can be used for this purpose, so that, even when suitable specifically light friction ring materials are used, a brake disc has to be assembled of a friction ring, that is manufactured of a first, specifically suitable material, and of a brake disc chamber, that is manufactured of a second, different specifically suitable material. However, in the case of such a brake disc assembled from different materials, which, or especially whose friction ring, as known, may significantly heat up during operation, the different thermal expansion behavior of the various materials may result in problems, for example, in the form of a shielding known to the person skilled in the art, but at least in undesirable tensions in the brake disc. It should be explicitly mentioned at this point that, as an alternative, the friction ring may also be shaped of a material that, compared with the material of the brake disc chamber, is specifically heavy or heavier, which leads to the same problems.

There is therefore needed a functionally reliable brake disc which is characterized by a further weight reduction.

This need is met by providing a brake disc wherein the ratio of the height of the friction ring measured in the radial direction to the diameter of the brake disc is less than 0.12 with respect to the amount, and that the connection between the brake disc chamber and the friction ring with the prestressed support wall section is established such that the edge region of the brake disc chamber acts in an outwardly pressing manner in the radial direction on the friction ring directly or indirectly by way of the connection elements when the friction ring has not been heated by a braking operation.

Two mutually functionally related measures are provided, specifically a geometrical design configuration, whose implementation becomes possible only on the basis of the second mentioned measure, specifically by the quasi-prestressed brake disc chamber, because only that can achieve a functionally reliable shaping of the brake disc as a whole. Concretely, it is first provided to, viewed in the radial direction, design the friction ring narrower than is customary; i.e. to provide a friction ring with a lower height (measured in the radial direction) than previously customary. In any case, if the material of the friction ring is specifically heavier than the material of the brake disc chamber, a reduction of the friction ring height (measured in the radial direction) causes an especially intensive reduction of the weight of the brake disc, particularly because the friction ring is situated farther to the outside in the radial direction than the brake disc chamber.

In the present case, the reduced friction ring height is defined by the ratio of the friction ring height to the total diameter of the brake disc. In the case of known brake discs of passenger cars in use today, the above-mentioned ratio is in the order of magnitude of between 0.14 and 0.17. In the present case, a brake disc is now provided that has a friction ring whose height is maximally 0.12 times the entire brake disc diameter.

By means of a brake disc friction ring dimensioned as disclosed above, if calipers are used that are currently customary and interact with the friction ring, in connection with slightly narrower brake pads, braking torques can be reached that are normal in the case of passenger cars; particularly if the diameter of the brake disc is increased slightly in comparison to the design currently customary, because then, while the pressing force of the brake pads onto the friction ring remains the same, a larger lever arm will be available for the resulting braking torque.

However, a friction ring that is narrower than previously customary friction rings, i.e. it is not as high, during the operation, i.e. during high braking operations, may heat up more than a conventionally dimensioned friction ring of a built-up brake disc having a brake disc chamber carrying the friction ring. Even though the thermal expansion coefficient of a specifically heavy friction ring material, such as gray cast iron or a special steel, may possibly be (significantly) lower than the thermal expansion coefficient of the material of the brake disc chamber, which preferably may be an aluminum alloy, because of the fact that the temperature of the friction ring becomes significantly higher during braking than that of the brake disc chamber, a different thermal expansion of these two component parts of the brake disc can be determined. The same may also apply to the friction ring when certain specifically extremely light materials are used; i.e. also when using such materials (which are considerably more expensive compared with gray cast iron or special steel, and can therefore be used economically only for a few applications), the problem may occur that the shielding known to the person skilled in the art has to be prevented. In addition, the above-mentioned specifically extremely light friction ring material may be an aluminum-saturated silicon-carbide matrix or a carbon fiber silicon carbide, which are both very suitable as friction partners for brake pad friction linings of disc brakes.

So that the different thermal expansion mentioned in the preceding paragraph, i.e., the thermal expansion of the friction ring that is higher than the thermal expansion of the brake disc chamber, will not result in problems, particularly in the connection region between the friction ring and the brake disc chamber or in the above-mentioned shielding, the brake disc chamber is built together or connected in a prestressed manner with the friction ring. This prestressing will have the effect that, when the friction ring is not heated by a braking operation, the edge region of the brake disc chamber acts in an outwardly pressing manner in the radial direction upon the friction ring directly or indirectly by way of the connection elements, and this prestressing can easily be represented or is represented particularly by the shaping of the brake disc chamber, specifically by the truncated-cone-shaped support wall section and/or its edge region.

By means of the characteristics explained above, it becomes possible, deviating from the brake disc indicated in DE 10 2006 043 945 A1, to provide connection elements in the form of rivets or screws between the brake disc chamber and the friction ring, whose longitudinal axis extends parallel to the axis of rotation of the brake disc. Such connection elements can be inserted more easily than the pins provided in the above-mentioned state of the art which extend in the radial direction.

If the support wall section has a plurality of openings, the weight of the brake disc chamber can advantageously also be kept low. In this case, the required stability can, for example, be achieved in that the support wall section is designed, at least in regions, in the form of a framework. Furthermore, again in view of the different thermal expansions of the friction ring and the brake disc chamber, the edge region of the support wall section can, in each case, have an at least slightly elastic construction between connection elements that are mutually adjacent in the circumferential direction, which can be implemented in a particularly intensive manner if the edge region is constructed in the form of individual mutually separated segments. A construction of the edge region of the brake disc chamber which may, for example, be in the form of a "swan-neck", and is at least slightly elastic viewed in the radial direction, can be used for the same purpose as well as for generating a desired prestressing, by which the edge region of the brake disc chamber can act upon the friction ring while pressing outward in the radial direction.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
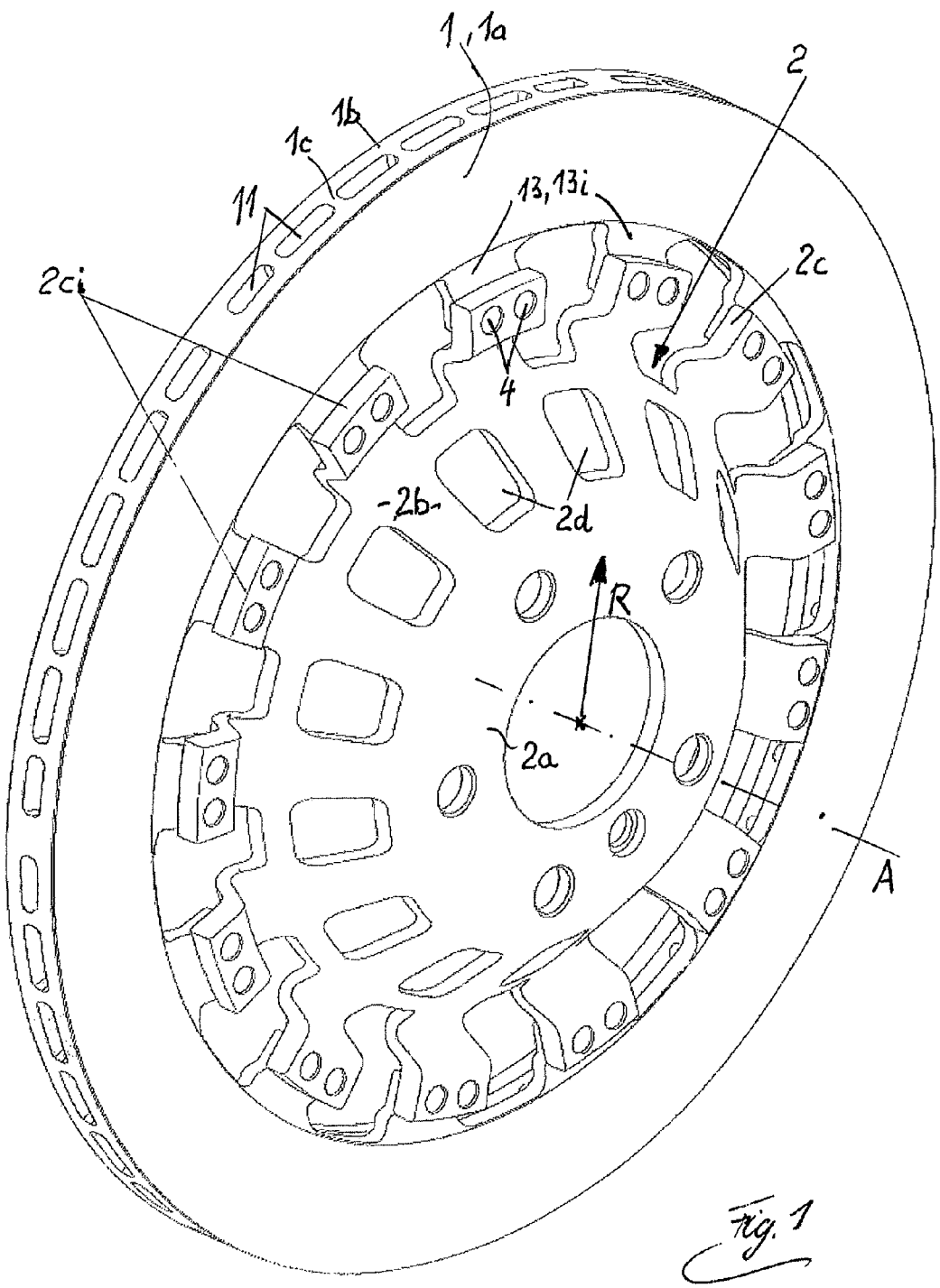
FIG. 1 is a perspective view of an embodiment of a brake disc according to the present invention.

Reference number 1 identifies an internally ventilated friction ring 1 of a brake disc of a vehicle disc brake, which friction ring 1 therefore has several ventilation slots 11 along the circumference, which slots 11 extend in the radial direction R. In a manner known to a person skilled in the art, brake pads having friction linings extending only over a small portion of the friction ring circumference and held by a caliper (not shown in the figures) can act in a pressing fashion upon the front and rear sides of the double-walled friction ring 1.

The brake disc 1 is preferably fastened in a normal manner to a hub (which is not shown) of a wheel of the vehicle, specifically by way of the so-called brake disc chamber 2, which carries the friction ring 1. The brake disc chamber 2 consists of a central flat so-called hub section 2a that is perpendicular to the axis of rotation of the above-mentioned wheel or to the axis of rotation A of the brake disc. The hub section 2a is adjoined by a so-called support wall section 2b of the brake disc chamber 2, which support wall section 2b extends outward in the radial direction R and has an edge region 2c. In the present embodiment, the edge region 2c is formed by thirteen quasi finger-shaped segments 2ci of a ring, whose face sides are perpendicular at least in the region of the free ends of the finger-type segments 2ci with respect to the axis of rotation A. The finger-type segments 2ci project in the radial direction R toward the outside from a region of the support wall section 2b which is situated between its above-mentioned edge region 2c and the hub section 2a of the brake disc chamber 2 and has the shape of a truncated circular cone with a cone axis coinciding with the axis of rotation A.

Figure 2:
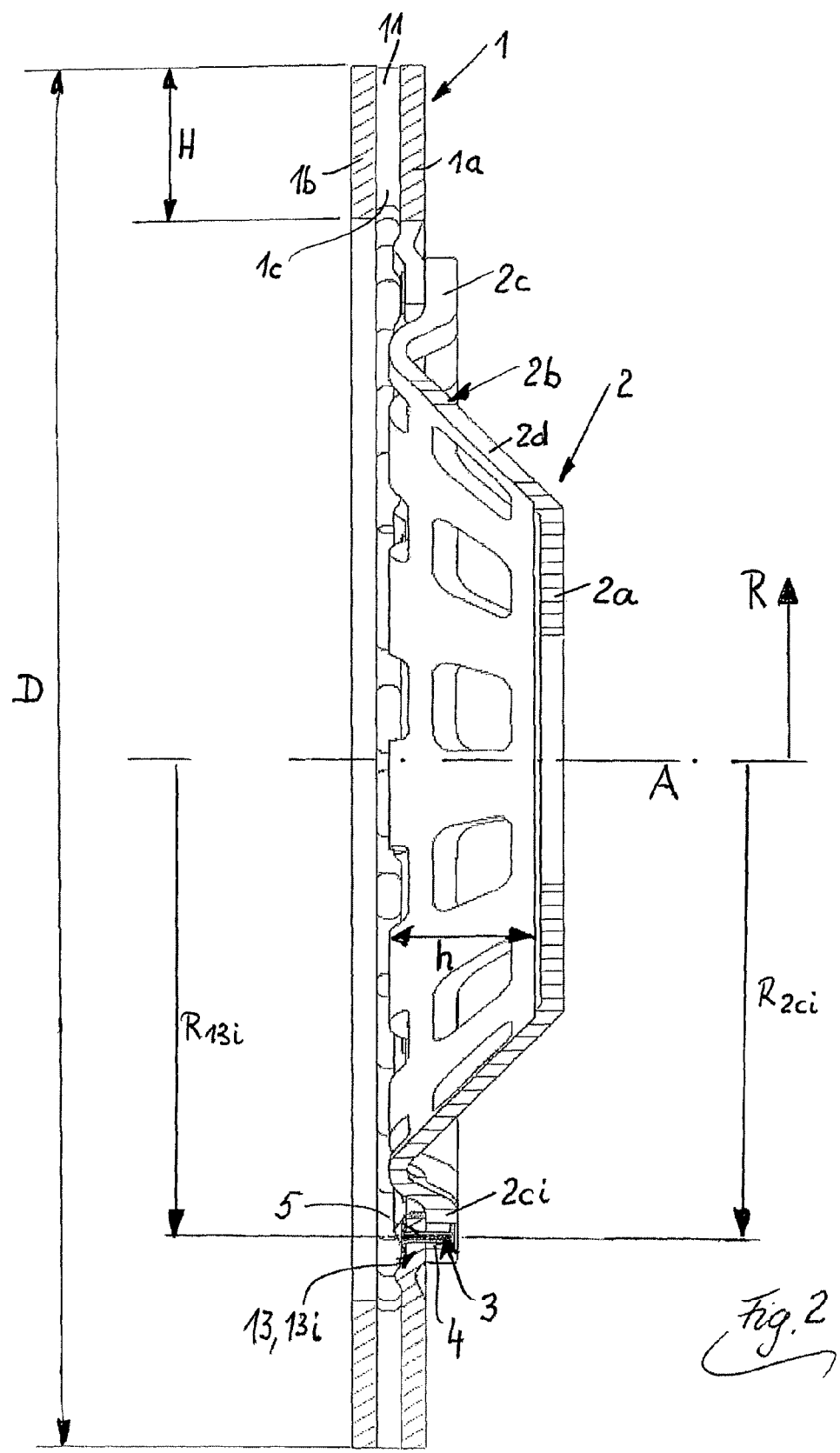
FIG. 2 is a cross-sectional view of the brake disc embodiment shown in FIG. 1 with one connection element being illustrated.

By way of the above-mentioned edge region 2c, the brake disc chamber 2 supports the friction ring 1, specifically by way of several connection elements 3 distributed over the circumference of the friction ring or the edge region 2c, of which only one connection element is illustrated at the bottom in FIG. 2. Concretely, for showing this connection between the brake disc chamber 2 and the friction ring 1, in the present case, a so-called support ring section 13 is molded to one of the two walls of the friction ring 1 and there to the exterior wall 1a, which in the conventional manner is connected with the interior wall 1b by way of webs 1c, the ventilation slots 11 extending between the webs 1c. In the present case, this support ring section 13 interacting with the edge region 2c of the brake disc chamber 2 is designed analogous to this edge region 2c and is therefore also formed by support ring segments 13i which are molded to the inner circumference of the exterior wall 1a of the friction ring and (also—like the segments 2ci of the edge region 2c) quasi form fingers projecting in the radial direction. Each support ring segment 13i of the support ring section 13 of the friction ring 1 comes to overlap with a segment 2ci of the brake disc chamber 2 viewed in the axial direction A, these mentioned elements resting upon one another in regions. Passage bores 4 and 5 respectively, which also come to overlap with one another and extend in the axial direction A are provided in the segments 2ci of the edge regions 2c as well as in the support ring segments 13i, in which passages bores 4 and 5 connection elements 3 are placed, in the present case, in the form of rivets, by which the friction ring 1 and the brake disc chamber 2 are therefore mutually connected in a tensionally locked and/or form-fitting manner. In the present case, the passage bores 4 in the segments 2ci have a larger diameter than the passages bores 5 in the support ring segments 13i, but this is not essential.

At this point, it is explicitly pointed out that the design of the edge region 2c and/or of the support ring section 13 can also be configured differently than in the present case; only the edge region 2c of the support wall section 2b needs to be connected with the friction ring 1 by use of suitably designed connection elements 3. The connection between the brake disc chamber 2 and the friction ring 1 with the prestressed support wall section 2b is established such that, when the friction ring 1 is not heated as a result of a braking operation, the edge region 2c of the brake disc 2 (or of its support wall section 2b) acts directly or by way of the connection elements 3 indirectly in the radial direction R in an outwardly pressing manner upon the friction ring 1.

This "pressing effect", as well as the ratio of the height H of the friction ring 1 measured in the radial direction R to the diameter D of the brake disc (compare particularly FIG. 2) being less in its amount than 0.12 (in the present case=0.11), is implemented in the presently explained embodiment. In this case, the above-mentioned radially outward pressing effect by way of the support ring section 13 of the friction ring 1 first takes place upon its exterior wall 1a and, by way of the webs 1c, finally also upon the interior wall 1b of the double-wall friction ring 1. The corresponding radially outward pressing force of the brake disc chamber 2 is simply caused by its shaping, specifically by the truncated circular cone shape of the support wall section 2b or of the correspondingly truncated-cone-shaped region of the latter, in connection with the concrete geometrical dimensions. In the present embodiment, the center points of the passage bores 4 in the edge region 2c of the brake disc chamber 2 are therefore situated on a slightly larger radius (compare FIG. 2: $R_{2ci}$) with respect to the axis of rotation A than the center points of the corresponding passage bores 5 in the support ring segments 13i of the friction ring 1, which are situated on the slightly smaller radius $R_{13i}$. With the inserting of the connection elements 3 into the partially mutually overlapping passage bores 4, 5, the required prestressing in the support wall section 2b can be generated which, in the assembled condition, produces the above-mentioned "pressing effect".

In the present case, for intensifying this effect, by which the brake disc chamber 2, when the friction ring 1 is not heated, acts directly or by way of the connection elements 3 indirectly pressing outwardly in the radial direction R upon the friction ring 1, the edge region 2c of the support wall section 2b or of the brake disc chamber 2, viewed in the radial direction R, is constructed to be at least slightly elastic. This elastic construction—as illustrated in FIG. 2—is formed by a so-called swan-neck or wavy shape of the finger-type segments 2ci, in that, viewed in the radial direction R, the latter have an appropriate S-type or serpentine-type shape.

Coming back to the essential height ratio, specifically the fact that the ratio of the height H of the friction ring 1 measured in the radial direction R to the diameter D of the brake disc is less than 0.12, it is pointed out that the height H relates to the double-walled region of the friction ring 1, i.e. this height H is to be measured over the two walls 1a, 1b of the friction ring 1 interacting with the brake linings and is essentially identical for both walls 1a, 1b. In contrast, when determining the height H of the friction ring 1, its support ring section 13 should not be taken into account; as illustrated in FIG. 2, this support ring section 13 is not considered when determining the height H of the friction ring 1.

In the case of the present embodiment, the ratio of the height h of the truncated circular cone measured in the direction of the cone axis (=axis of rotation A) describing a partial region of the support wall section 2b, to the diameter D of the brake disc quantitatively amounts to 0.076. For brake discs according to the invention, this just mentioned numerical ratio is preferably in the order of magnitude of between 0.07 and 0.08, because best results were achieved in this manner. As illustrated, the support wall section 2b of the brake disc chamber 2 has a plurality of openings 2d reducing the weight of the brake disc chamber 2. A further weight reduction, while the stability is simultaneously high, is achieved if the friction ring 1 consists at least partially of DISPAL aluminum material that is formed by a silicon-carbide matrix saturated with aluminum.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake disc for a vehicle disc brake, comprising:
    a friction ring;
    a brake disc chamber configured to support the friction ring, the brake disc chamber being made of a specifically light material and having a central flat hub section perpendicular to an axis of rotation of the brake disc and a support wall section connected to the central flat hub section and extending radially outward, the support wall section having, at least in some regions, a truncated circular cone shape;
    wherein the friction ring is connected via connection elements to a free edge region of the support wall section, the friction ring being made of a different material than that of the brake disc chamber;
    wherein a ratio of a height of the friction ring measured in a radial direction to a diameter of the brake disc is less than 0.12, and a connection between the brake disc chamber and the friction ring is produced with a prestressing of the support wall section such that the free edge region of the brake disc chamber acts in an outwardly pressing manner in the radial direction on the friction ring directly or indirectly via the connection elements when the friction ring is not in a heated condition due to braking operation; and
    wherein, viewed in the radial direction, the free edge region of the support wall section of the brake disc chamber has a slightly elastic construction, the slightly elastic construction being formed by finger-type segments of the free edge region configured to have an approximate S-type shape viewed in the radial direction.

2. The brake disc according to claim 1, wherein the brake disc is an internally ventilated brake disc having a double-walled friction ring made of gray cast iron, a special steel or a specifically extremely light material.

3. The brake disc according to claim 2, wherein the extremely light material is one of an aluminum-saturated silicon-carbide matrix and a carbon filter silicon carbide.

4. The brake disc according to claim 1, wherein the connection elements are one of rivets and screws whose longitudinal axis is arranged parallel to the axis of rotation of the brake disc.

5. The brake disc according to claim 1, wherein the support wall section of the brake disc chamber comprises a plurality of openings.

6. The brake disc according to claim 5, wherein the support wall section is configured in a framework form.

7. The brake disc according to claim 1, wherein the free edge region of the support wall section of the brake disc chamber in areas between connection elements that are mutually adjacent in a circumferential direction is configured to be at least slightly elastic.

8. The brake disc according to claim 1, wherein a ratio of a height of the truncated circular cone of the support wall section, measured in a direction of the axis of rotation of the brake disc, to the diameter of the brake disc is in the order of magnitude of between 0.07 to 0.08.

9. The brake disc according to claim 1, wherein the brake disc is a brake disc for a passenger car vehicle disc brake.

10. A brake disc for a vehicle disc brake, comprising:

a friction ring having first and second friction side surfaces arranged parallel to one another and perpendicular to an axis of rotation of the brake disc;

a brake disc chamber having a central flat hub section arranged perpendicular to the axis of rotation of the brake disc and a support wall section extending from the central flat hub section outwardly at an angle relative to the axis of rotation of the brake disc toward the friction ring, the friction ring being made of a specific lightweight material and the brake disc chamber being made of a different material;

wherein an outer edge region of the support wall section comprises a plurality of finger-type segments having a slightly elastic construction, each finger-type segment having a wavy shape in cross-section, wherein a side surface of each finger-type segment arranged perpendicular to the axis of rotation faces a corresponding side surface of projections extending radially inward from the friction ring; and connection elements operatively configured to connect the brake disc chamber to the friction ring via the finger-type segments and the projections, such that the outer edge region of the support wall section acts in an outwardly pressing manner in the radial direction upon the friction ring when the friction ring is not heated due to braking operation; and wherein a ratio of a height of the friction ring measured in the radial direction to a diameter of the brake disc is less than 0.12.

11. The brake disc according to claim 10, wherein mounting apertures arranged parallel to the axis of rotation are formed in the finger-type segments and the projections, said mounting apertures receiving the connection elements; and wherein the mounting apertures on the finger-type segments are circumferentially arranged at a radius from the axis of rotation that is greater than the radius from the axis of rotation at which the mounting apertures in the projections are circumferentially arranged.

12. The brake disc according to claim 10, wherein the brake disc is an internally ventilated brake disc having a double-walled friction ring, the projections projecting inwardly from one of the walls of the double-walled friction ring.

\* \* \* \* \*